United States Patent [19]

Gotoh et al.

[11] Patent Number: 4,633,519
[45] Date of Patent: Dec. 30, 1986

[54] DIVERSITY RECEPTION SYSTEM IN A PORTABLE RADIO APPARATUS

[75] Inventors: Akio Gotoh; Kazuo Yamamoto; Tuguo Ishikawa, all of Tokyo, Japan

[73] Assignee: Tokyo Shibaura Denki Kabushiki Kaisha, Japan

[21] Appl. No.: 595,703

[22] Filed: Apr. 2, 1984

[30] Foreign Application Priority Data

Mar. 31, 1983 [JP] Japan ............................ 58-53518

[51] Int. Cl.$^4$ ............................................. H04B 7/08
[52] U.S. Cl. .................................... 455/277; 455/134
[58] Field of Search ............... 455/277, 134, 135, 52; 375/100, 40

[56] References Cited

U.S. PATENT DOCUMENTS 2,266,630 12/1941 Forbes ............................... 455/277
4,255,816 3/1981 Grunza et al. ..................... 455/277
4,332,032 5/1982 Daniel ................................ 455/277
4,403,343 9/1983 Hamada ............................. 455/277
4,450,585 5/1984 Bell .................................... 455/135
4,495,653 1/1985 Hamada ............................. 455/277
4,499,606 2/1985 Rambo ............................... 455/277

Primary Examiner—Marc E. Bookbinder
Assistant Examiner—Andrew J. Telesz, Jr.
Attorney, Agent, or Firm—Banner, Birch, McKie & Beckett

[57] ABSTRACT

A portable radio used with this invention has two different types of antenna, such as a monopole antenna and a loop antenna. The diversity reception system continuously selects that one of the antenna which provides the better received signal. Antenna selection is performed such that the received signal level is compared with two or more preset threshold levels, and antennas are switched when and only when the received signal level fails to satisfy certain predetermined conditions.

6 Claims, 11 Drawing Figures

DIVERSITY RECEPTION SYSTEM IN A PORTABLE RADIO APPARATUS

BACKGROUND OF THE INVENTION

1. Field of the Invention

This invention relates to a diversity system in a portable radio for maintaining the high quality of received signals. A radio telephone apparatus or the like is a typical example of a portable radio of this type.

2. Description of the Prior Art

Many prior art portable radios have been provided with extendable monopole antennas. Monopoles, dipoles and other electric-field-type antennas are likely to be adversely affected by the human body; and if they are used in proximity to the human body the antenna's gain is lowered. Consequently, prior art portable radios of this type have the drawback that, when a radio is worn or placed in a pocket during use, the gain of the monopole antenna, even if extended, is lowered, thereby degrading reception.

Some prior art portable radios have been provided instead with magnetic-field-type antennas such as loop antennas whose gain is improved by the influence of a human body, eventually avoiding the above stated drawback. These radios include pagers, portable radio telephones and the like. This type of portable radio has the drawback that when it is placed on a table or otherwise not worn by the user, the gain of the antenna will be reduced, thereby degrading reception.

So-called mobile communications involve a complex propagation having multiple propagation paths generated by reflection of radio waves from buildings and other obstacles between a transmitter and a receiver by scattering and refraction from inhomogeneities in the atmosphere. A standing wave is likely to be produced at the point of reception. Movement over even a slight distance causes a variation of field strength ("fading") which can be approximated by a Rayleigh distribution. This particular fading is generally called Rayleigh fading and is characterized by an occasional great decrease in field strength. Diversity is frequently used to achieve good communication in the presence of Rayleigh fading. In space diversity, for instance, two or more identical types of antennas spaced more than one quarter wavelength from each other receive signals which are then combined or selected to diminish the effects of the fading phenomenon. The space diversity system, of course, has been difficult to apply to portable radios because of the requirement for distance between antennas.

SUMMARY OF THE INVENTION

It is an object of the present invention to provide a diversity reception system in a portable radio capable of maintaining high quality communication against the effects of the human body.

It is another object of the present invention to provide a diversity reception system in a portable radio capable of maintaining high quality communication against Rayleigh fading.

It is another object of the present invention to provide a diversity reception system in a portable radio which may be effectuated by simple circuit construction.

It is another object of the present invention to provide a diversity reception system in a portable radio which may be employed even in compact equipment.

In order to achieve the above objects the invention uses two different antenna types such as a linear antenna (like a monopole or dipole antenna) and a loop antenna. The system selectively uses and continuously selects the antenna which provides the better received signal level. Antenna selection is performed so that the received signal level of the selected antenna is compared with two or more preset threshold levels, the selected antenna is continuously selected when the received signal level satisfies predetermined conditions, and the other antenna is selected when the received signal level (from the selected antenna) does not satisfy the predetermined conditions.

DETAILED DESCRIPTION OF THE PREFERRED EMBODIMENT

Figure 1:
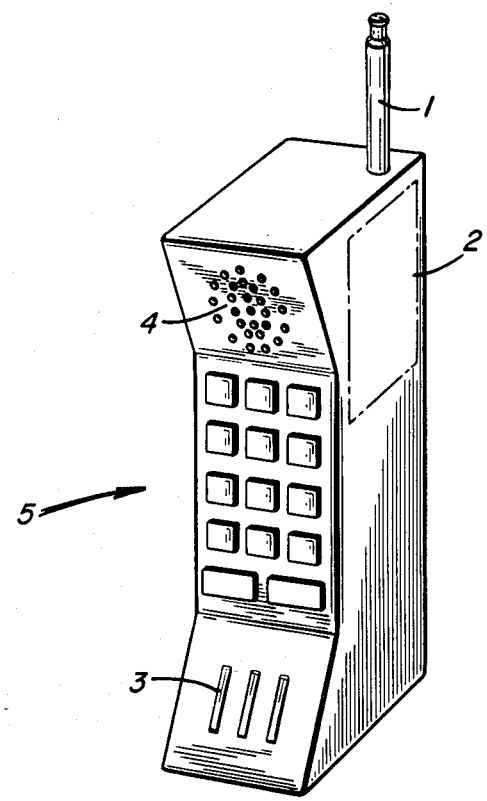
FIG. 1 is a perspective view of a portable radio telephone to which this invention is applied.
Figure 2:
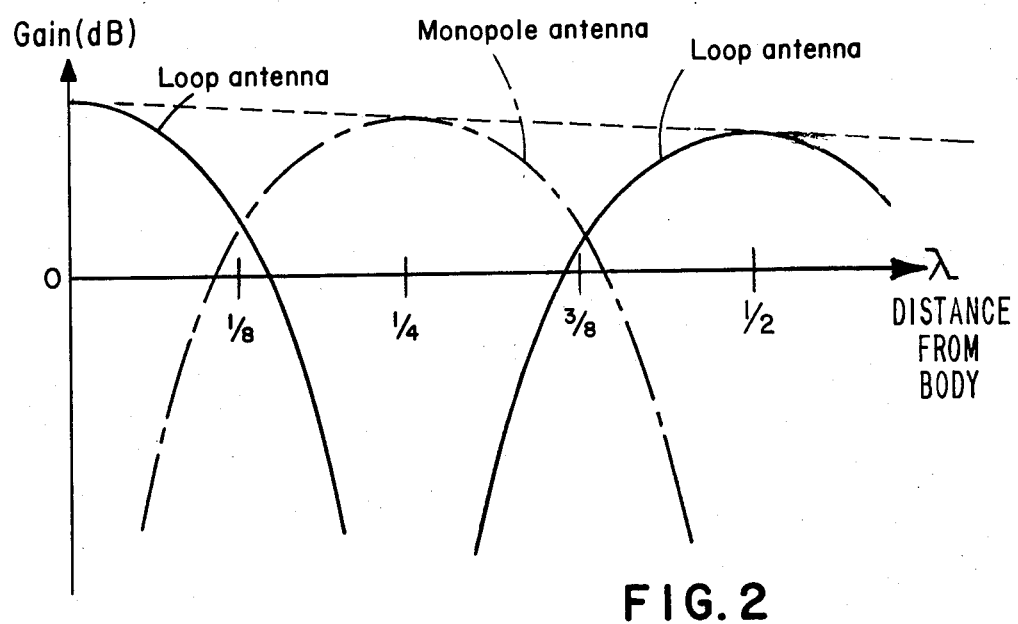
FIG. 2 is a graph showing changes in antenna gain for both a monopole antenna and a loop antenna with distance from the human body.

A portable radio telephone to which this invention may be applied is shown in FIG. 1 and includes an extendable monopole antenna 1, a loop antenna 2 disposed within the radio housing, a microphone 3, a loud speaker 4, and a keypad 5 for dialing. As stated above, the gain of monopole antenna 1 decreases, and that of loop antenna 2 increases, when the radio is placed very close to (within ¼ wavelength of) a human body. The gain of loop antenna 2 is particularly increased when the plane of the loop is normal to the nearest surface of the human body, and therefore loop antenna 2 is located, as shown in FIG. 1, normal to the side of the housing where the perforations for microphone 3 and speaker 4 are formed. In particular, loop antenna 2 comprises a compact printed circuit board having a loop made of a conductor. The compact printed circuit board is attached to the housing perpendicular to the control panel. It should be noted that the monopole antenna can be collapsed into the housing. FIG. 2 is a graph showing changes in gain for monopole antenna 1 and loop antenna 2 with distance from the human body. The longitudinal axis of monopole antenna 1 is arranged to be parallel to the longitudinal axis of the body of the user.

The radio telephone is connected through a radio link to a base station (not shown), in the telephone subscription network, which in turn is connected to a landline and relays communications to another subscriber's telephone. Either antenna may be selected for reception of radio signals. For example, if, during reception, the radio is located on a table, monopole antenna 1 may be selected to receive the signals. Conversely, if the portable radio telephone is grasped by the user in the course of communication, the loop antenna will probably be selected to receive the signals.

Figure 3:
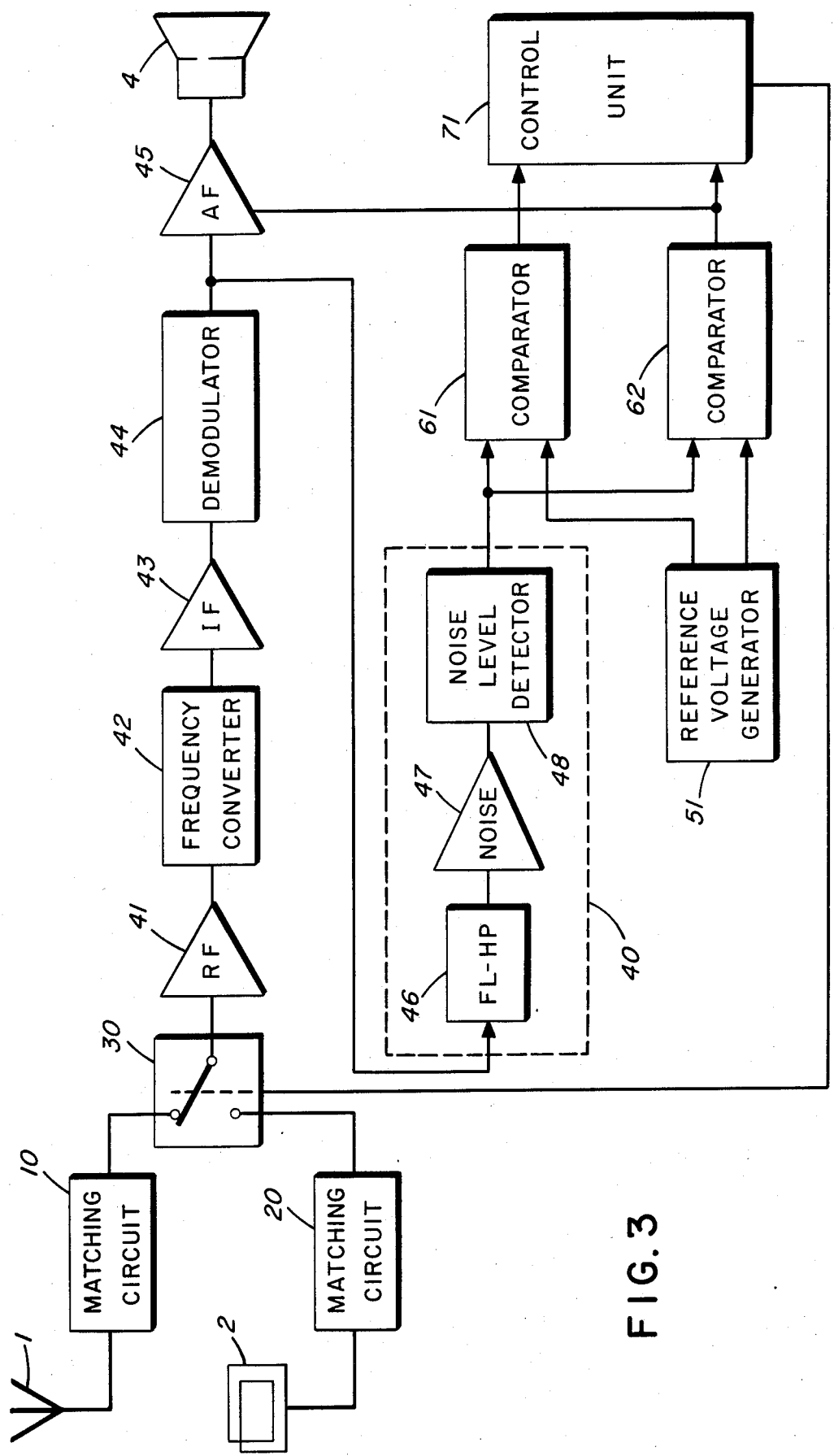
FIG. 3 is a block diagram showing one embodiment of the invention applied to a portable radio telephone.

FIG. 3 is a block diagram showing one embodiment of the invention as applied to a portable radio telephone. Matching circuit 10 converts the impedance of monopole antenna 1 to the input impedance of a high-frequency amplifier 41, while matching circuit 20 converts the impedance of loop antenna 2 to the input impedance of amplifier 41. Switch 30 is used to select either monopole antenna 1 or loop antenna 2. High-frequency amplifier 41 performs well-known functions, such as amplifying high-frequency signals, and preventing local oscillator signals from frequency converter 42 from radiating. Converter 42 converts weak microwave signals to an intermediate frequency, enhancing reception sensitivity of the microwave signals. Intermediate frequency amplifier 43 amplifies the intermediate frequency signal, demodulator 44 demodulates the amplified intermediate frequency signal, and audio frequency amplifier 45 amplifies the demodulated signals to drive loudspeaker 4.

Squelch circuit 40 comprises high pass filter 46, which extracts noise signals above the baseband, noise amplifier 47, and noise level detector 48, which rectifies and filters the amplified noise. The result is the squelch signal, a DC voltage level representative of the received signal strength.

The squelch signal is compared, in comparators 61 and 62, respectively, with two different reference voltage levels produced by reference voltage generator 51. The first reference voltage, input to comparator 61, corresponds to a received signal strength arbitrarily defined as "high." The second reference voltage, applied to comparator 62, corresponds to a lesser received signal strength—the minimum acceptable level for communication. Each comparator produces a logical "0" at its output when the reference voltage (first or second, as appropriate) applied to it is lower than the squelch signal, and a logical "1" otherwise. The operation of audio frequency amplifier 45 is controlled by the output of comparator 62.

Figure 4:
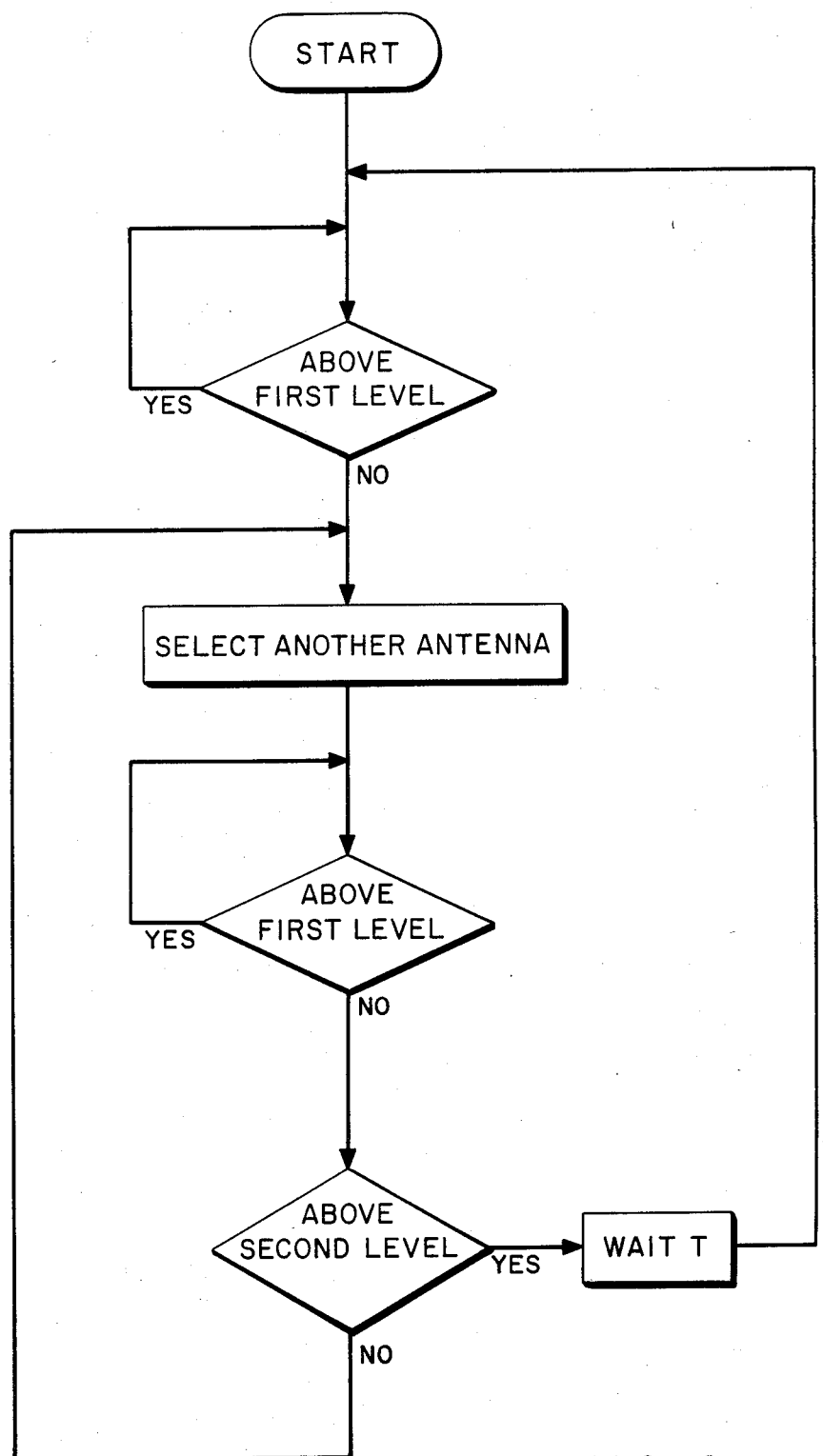
FIGS. 4 and 6 are flow charts for use in explaining the operation of the radio shown in FIG. 3.

An antenna switching operation of this embodiment will be described, with reference to FIG. 4, a flow chart of one mode of operation of control unit 71. Assume that the monopole antenna 1 is connected through switch 30 to the high frequency amplifier 41, and that a "high" signal level is being received. In this condition, comparators 61 and 62 both produce logical "0" outputs. When the received signal is degraded by influences from a human body or for any other reason, changing the output of comparator 61 to a "1," control unit 71 transmits a switching signal causing switch 30 to connect the loop antenna 2 to the high frequency amplifier 41. Control unit 71 then determines whether the output of comparator 61 has returned to "0." If it has, switch 30 is not switched, and loop antenna 2 remains connected to high frequency amplifier 41. If the output of comparator 61 is still "1," control unit 71 looks to the output of comparator 62. If this output is "1," control unit 71 transmits a switching signal to select the monopole antenna 1 again. However, if the output signal from comparator 62 is "0," control unit 71 waits for a predetermined length of time (T) and then detects the output from comparator 61 once again. If the output from comparator 61 is still "0," switch 30 is not switched, and the selection of loop antenna 2 is maintained. However, if comparator 61 is generating a "1," control unit 71 transmits a switching signal to select monopole antenna 1 again. If the squelch signal falls between the first and second reference levels, and if it does not exceed the first level within the predetermined time interval T, antennas 1 and 2 are switched. The predetermined time interval counted by control unit 71 preferably corresponds to the time required by a person carrying the radio to travel more than a quarter wavelength in the field of the standing wave, because there is a good probability of a decrease in the effects of fading after the lapse of this predetermined length of time (provided the user does not stand still).

Audio frequency amplifier 45 receives the output from comparator 62. Amplifier 45 is allowed to operate normally when the output of comparator 62 is "0," but operation is suspended by a hold circuit when the output is "1," so that the generation of audible sounds at speaker 4 is suppressed when the quality of the received signals deteriorates. Thus, generation of unfavorable noise due to poor quality of the received signals and from the antenna switching operation can be avoided.

Figure 5:
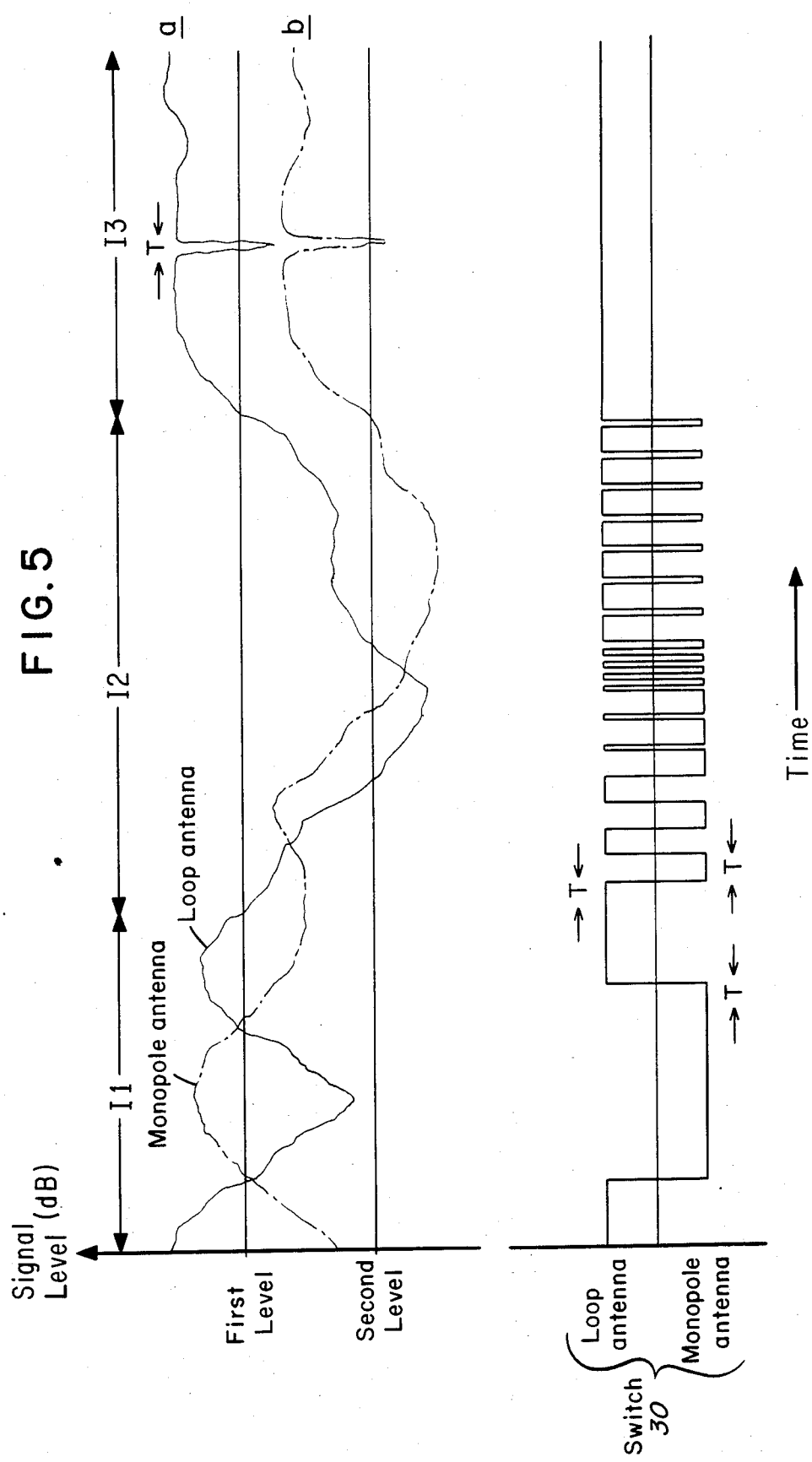
FIG. 5 is a graph showing changes in received signal level and the resulting switching between the antennas of the radio shown in FIG. 3, as the radio moves through a typical portion of space.

FIG. 5 is a timing chart for use in explaining antenna switching according to the embodiment of FIG. 3. Waveform a indicates the signal level received by loop antenna 2, while waveform b indicates the signal level received by monopole antenna 1. During good reception, as indicated by time interval I1, the level of at least one of the received signals (as indicated by the squelch signal) exceeds the first reference voltage level, and the selected one of the antennas continues to be used for reception. As shown in FIG. 5, during the time interval I1, loop antenna 2 is selected, then monopole antenna 1 is selected, and then loop antenna 2 is reselected.

When the radio wave is influenced by a building, or a weak radio wave is received, or the portable radio telephone is located far away from the base station, the signals received by the antennas 1 and 2 are set at low level (i.e., below the first level). In this embodiment, the antenna having the reception signal level is selected in accordance with a second level as a reference. As shown in FIG. 5, when the levels of the signals received by the monopole antenna 1 and the loop antenna 2 fall within the range between the first level and the second level during a time interval I2, the monopole antenna 1 and the loop antenna 2 are alternately selected. When the level of the signal received by loop antenna 2 falls below the second level, monopole antenna 1 is continuously selected during the time interval T, and then loop antenna 2 is selected. However, when the level of the signal received by loop antenna 2 remains below the second level, the monopole antenna 1 is instantaneously selected. In this case, when the level of the signal received by the monopole antenna 1 falls within the range between the first and second levels, monopole antenna 1 is selected and held again during the time interval T. Thereafter, when the level of the signal received by monopole antenna 1 falls below the second level, and the level of the signal received by loop antenna 2 falls within the range between the first and second levels, loop antenna 2 is selected and held during the time interval T. In this manner, when the levels of the signals received by the antennas 1 and 2 become below the first level, the antenna for obtaining the reception signal level of not less than the second level can be selected in practice. Therefore, even if the radio wave strength is decreased, the good quality of reception signal can be guaranteed.

Assume that the reception signal level is lowered due to fading or the like when a good reception state has been obtained and one of the antennas is continuously selected. As indicated by a time interval 13, the reception signal level is abruptly lowered. However, also assume that the portable radio telephone is in motion and that the influence of fading is eliminated within the time interval T. In this case, antenna switching during the time interval I3 is not performed. According to FIG. 5, the loop antenna 2 is selected and held during the time interval I3. In other words, even if the fading happens, unneccessary switching of antenna is not performed as long as the duration of fade is within the time interval T.

According to this embodiment, therefore, the portable wireless telephone apparatus placed on a table or the like is not influenced by the human body, and monopole antenna 1 having a good antenna gain is selected. However, when the apparauts is used and the head of the user comes close to the apparatus for communication, loop antenna 2 is selected, thereby preventing a decrease in the reception signal level and hence preventing signal quality degradation. When the gain of monopole antenna 1 is not greatly decreased, a good quality reception signal can be obtained using monopole antenna 1. Furthermore, when the portable wireless telephone apparatus is located so as to correspond to the "valley" of the standing wave, the reception signal level is greatly lowered. In such a state wherein the intensity of the electric field is very low (valley of the electric field), the magnetic field component is great, so that loop antenna 2 often has a reception signal level higher than that of monopole antenna 1. As a result, the decrease in the reception signal level which corresponds to the valley of the standing wave can be prevented upon proper selection of the antenna. Therefore, the influence of fading can be reduced.

Figure 6:
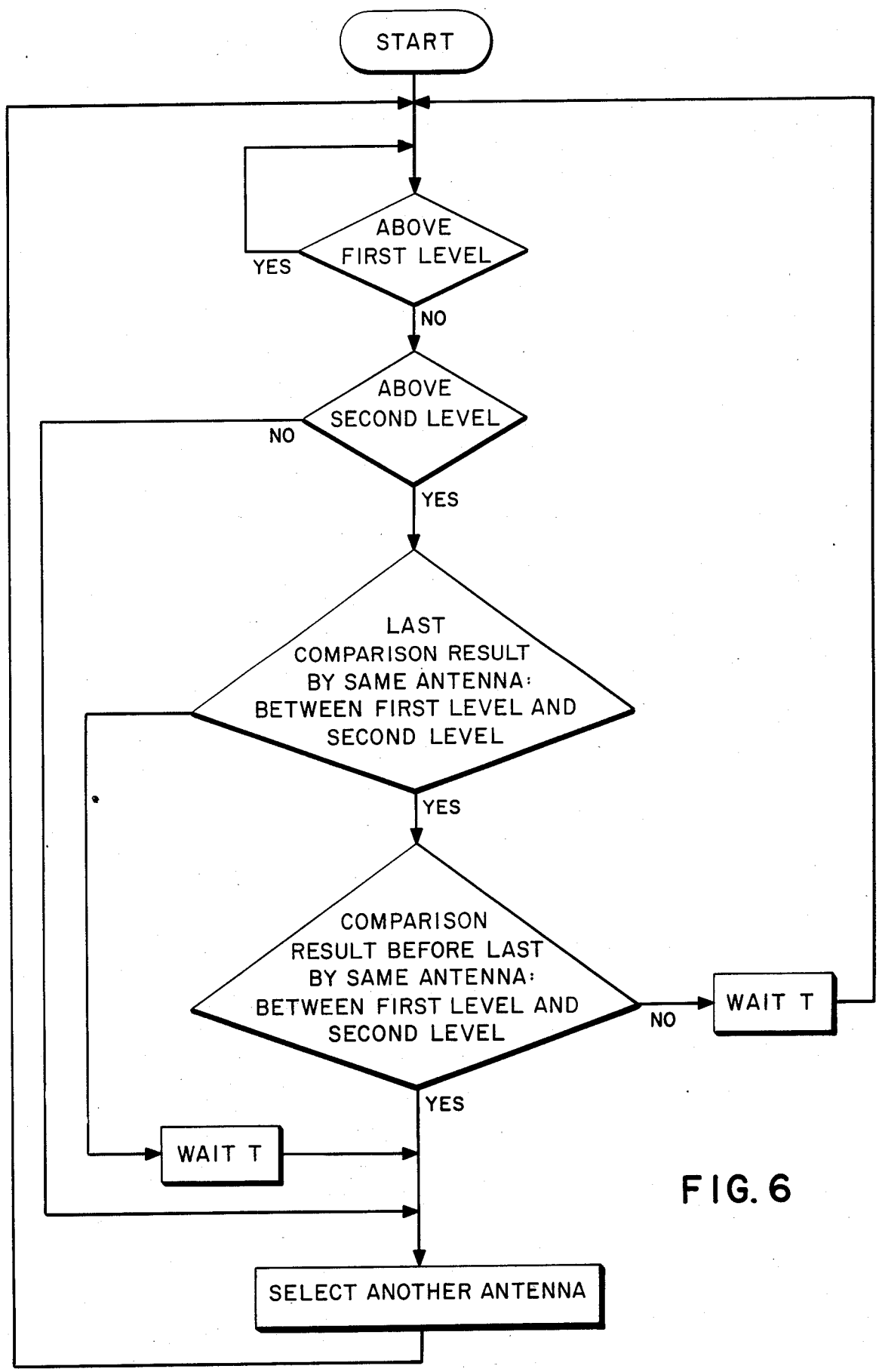

In an alternate mode of operation, as shown in FIG. 6, control unit 71 may store the outputs of comparators 61 and 62 when the squelch signal falls in the range between the first and the second levels. Control unit 71 may then control the antenna switching operation to inhibit switching between the antennas if the last set of comparator outputs for the same antenna indicates that the squelch signal was in the range between the first and second reference voltage levels and the next preceding set of comparator outputs, for the same antenna, indicates that the squelch signal was not in that range. According to this embodiment, unlike the embodiment shown in FIG. 4, control unit 71 causes continuous selection of one of the antennas for a time interval of 2T, when the output signal level by selected antenna falls in the range between the first level and the second level.

Figure 7:
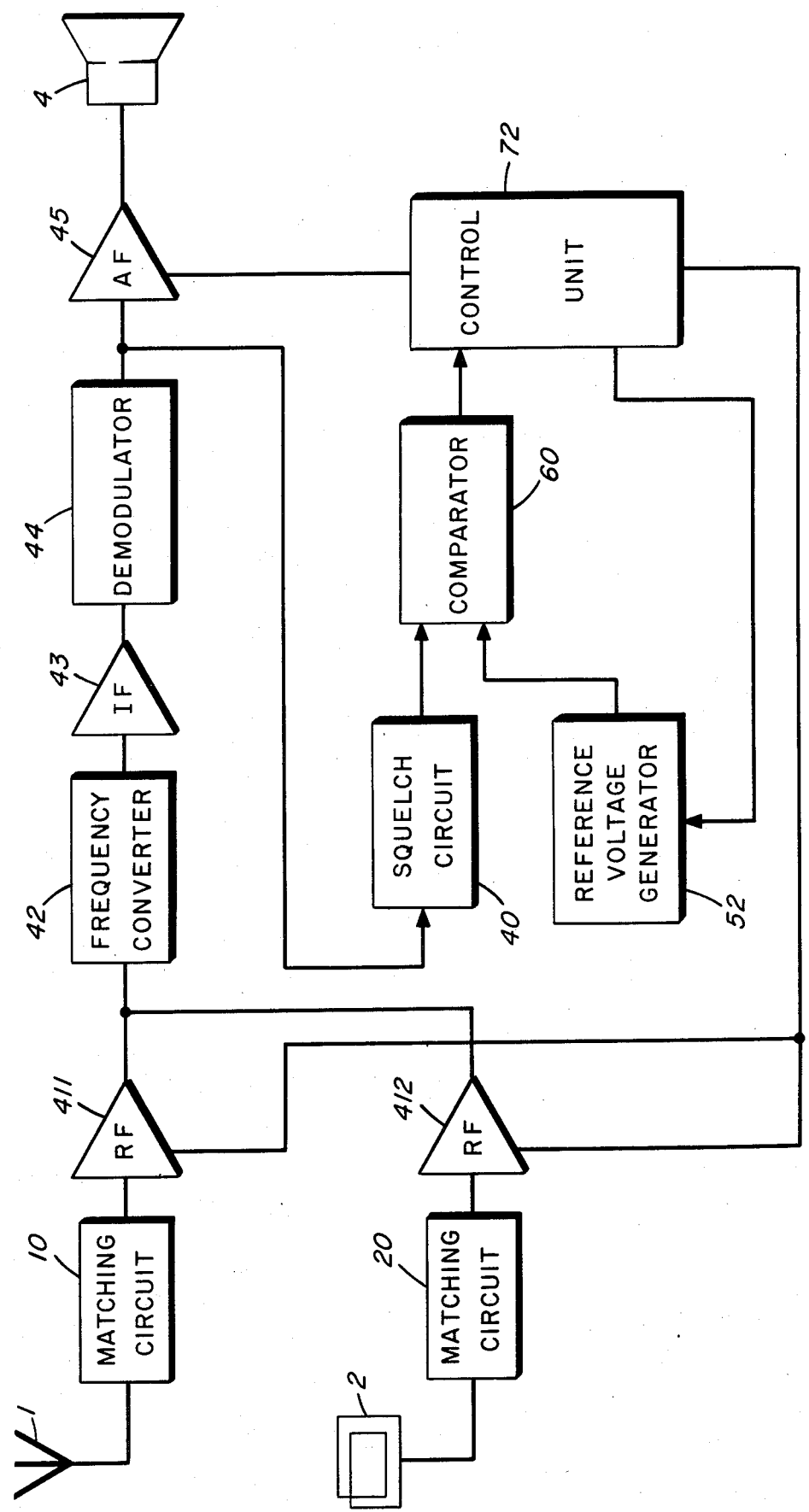
FIG. 7 is a block diagram showing another embodiment of the invention applied to a portable radio telephone.

FIG. 7 shows a block diagram of another embodiment of the invention applied to a portable radio telephone. Identical components to those shown in FIG. 3 are designated by the corresponding reference numerals from FIG. 3 and are excluded from any further description. The principal features of this embodiment are that either of high frequency amplifiers 411 and 412 may be selected, and that the voltage level from reference voltage generator circuit 52 is modified.

Figure 8:
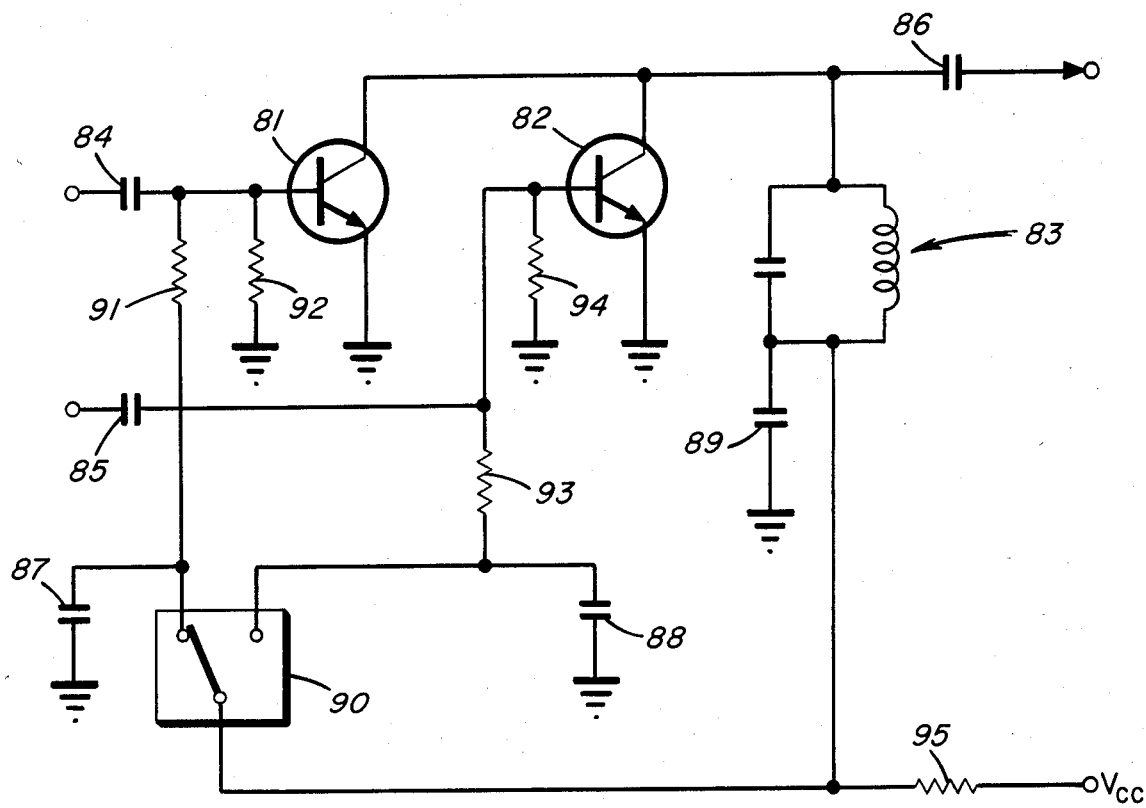
FIGS. 8 and 9 are circuit diagrams showing the main parts of the portable radio telephone of FIG. 7.

High frequency amplifiers 411 and 412 together have a circuit arrangement as shown in FIG. 8. Grounded-emitter transistor 81, whose base is connected through a coupling capacitor 84 to the output terminal of matching circuit 10, and a similar grounded-emitter transistor 82, whose base is connected through a coupling capacitor 85 to the output terminal of another matching circuit 20, have their collector terminals commonly connected through a coupling capacitor 86 to frequency converter 42. To the common connection is also connected a parallel tuned circuit 83 so that the amplifier is able to amplify a desired frequency band. A bypass capacitor 89 provides a high frequency ground for stabilizing the tuned circuit 83. A switch circuit 90 comprises a conventional transistor circuit for applying operating power to either transistor 81 or transistor 82. Reference numerals 91, 92, 93 and 94 designate bias resistors; 95, a resistor; and 87 and 88, bypass capacitors for high-frequency grounding the bases of the transistors 81 and 82. Assume that switch circuit 90 is switched as shown in FIG. 8, and a bias voltage is applied to the transistor 81, allowing output signals from matching circuit 10 to be amplified and introduced to frequency converter 42, whereas the base of transistor 82 is DC grounded, causing this transistor to be cut-off. As a result, the output impedance of transistor 82 increases. Thus, output signals from transistor 81 are not influenced by transistor 82. Because one of transistors 81 and 82 has a high output impedance, interference between output signals of the transistors 81 and 82 can be avoided.

Figure 9:
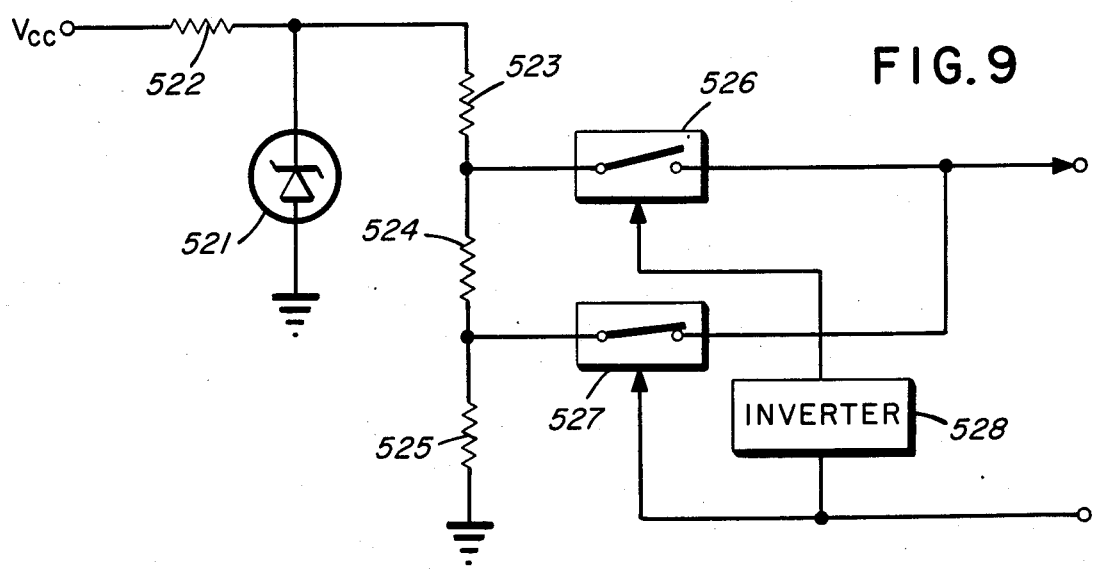

Reference voltage generator 52 has a circuit arrangement as shown in FIG. 9, and comprises a Zener diode 521 for stabilizing a source voltage Vcc, a resistor 522, divider resistors 523, 524 and 525, analog switches 526 and 527 and an inverter 528. The resistances of divider resistors 523, 524 and 525 are preset such that analog switches 526 and 527 receive input voltages of the first and second reference voltage levels, respectively. Suppose that analog switches 526 and 527 are switched in a manner as shown in FIG. 9. The second preset level signal is supplied to comparator 60. The inverter 528 serves to control switch 526 such that switch 526 is off whenever switch 527 is on, and vice-versa. Thus, switch 527 is turned on when a control signal from control unit 72 is a logical "1," and switch 526 is turned on when the control signal is logical "0." Comparator 60 generates a logical "1" signal when the level of the first or second reference voltage is higher than the level of the squelch signal. However, when the level of the first or second reference voltage is lower than the level of the squelch signal, comparator 60 generates a logical "0."

Figure 10:
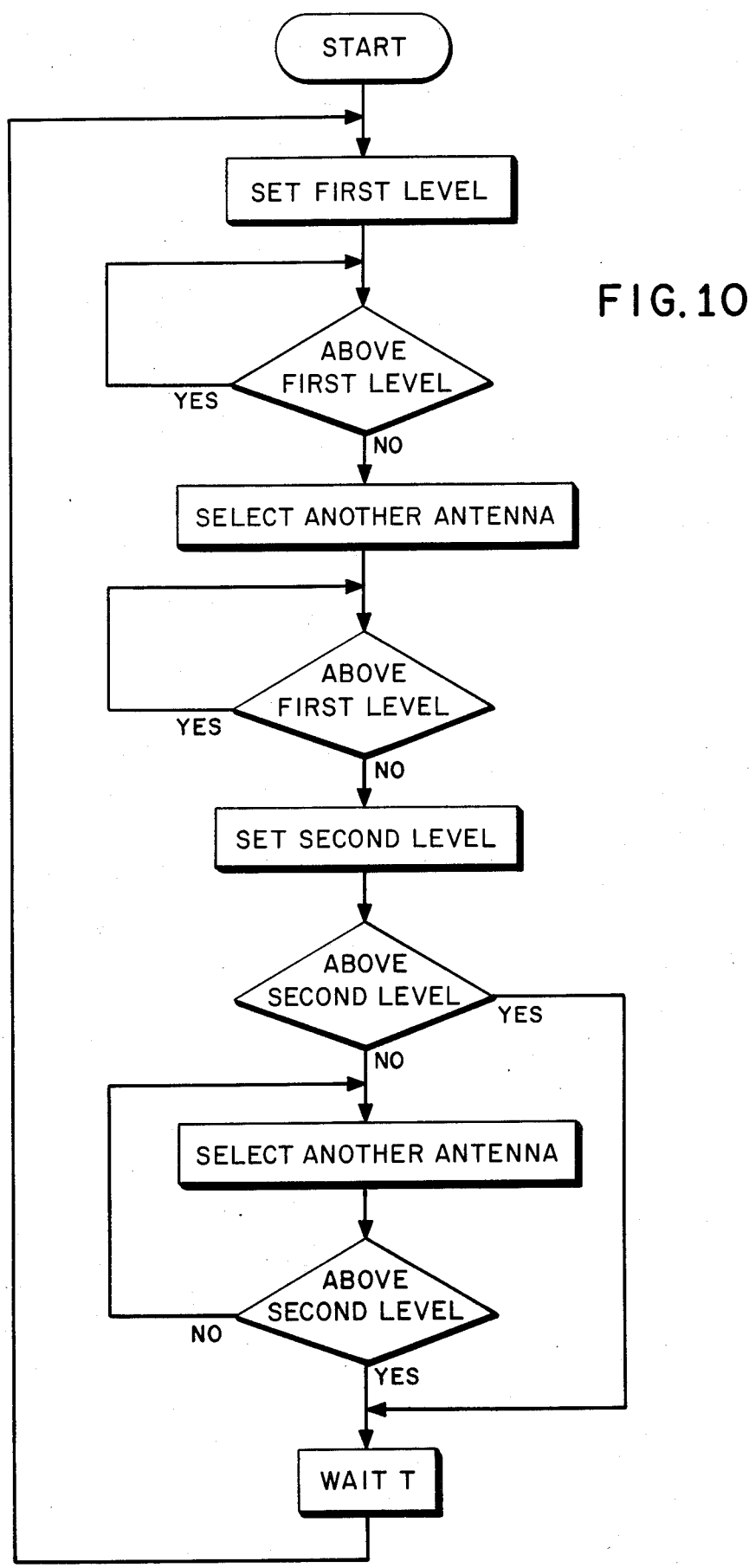
FIGS. 10 and 11 are flow charts for use in explaining the operation of the radio shown in FIG. 7.

Referring to FIG. 10 of a flow chart of the operation of control unit 72, an antenna switching operation of still another embodiment of the invention will be described. Suppose that an output signal from high frequency amplifier 41 is supplied to frequency converter 42. Control unit 72 supplies an "L" level control signal to reference voltage generator 52, causing the generator 52 to transmit the first preset level signal. Comparator 60 then compares the first preset signal with the output signal from squelch circuit 40.

Control unit 72 supplies a selection signal (control signal) to switch circuit 90 in response to a signal of "L" level from comparator 60. In this case, switch circuit 90 selects monopole antenna 1. However, control unit 72 supplies another selection signal (control signal) to switch circuit 90 in response to a signal of "H" level from comparator 60. In this case, switch circuit 90 selects loop antenna 2. When loop antenna 2 is selected due to influences from a nearby human body, control 72 detects an output signal level from comparator 60, and causes selection of loop antenna 2 to be maintained if it is at "L" level. If it is at "H" level, control unit 72 feeds a control signal of "H" level to reference voltage generator 52 to cause the latter to supply the second preset level signal. When the second preset level signal is thus supplied, control unit 72 detects an output signal level from comparator 60. If the output signal is set at "L" level, control unit 72 supplies an "L" level control signal to reference voltage generator 52 when a predetermined time interval has elapsed. Control unit 72 supplies the first preset level signal. If the output signal from comparator 60 is set at "H" levels, control unit 72 supplies the selection signal to switch circuit 90 which then selects monopole antenna 1. The level of the output signal from comparator 60 is then detected again. If the output signal level is at "L" level after selection of monopole antenna 1, control unit 72 supplies an "L" level control signal to reference voltage generator 52 after the elapse of a predetermined time interval, causing generator 52 to supply the first preset level signal. If the output signal from comparator 60 is set at "H" level, loop antenna 2 is selected again. The level of the output signal from comparator 60 is repeatedly detected.

In short, when the output signal level from squelch circuit 40 falls within the range between the first and the second levels, selection between antennas is performed unless the output signal level is above the first level after the elapse of a determined time interval.

Figure 11:
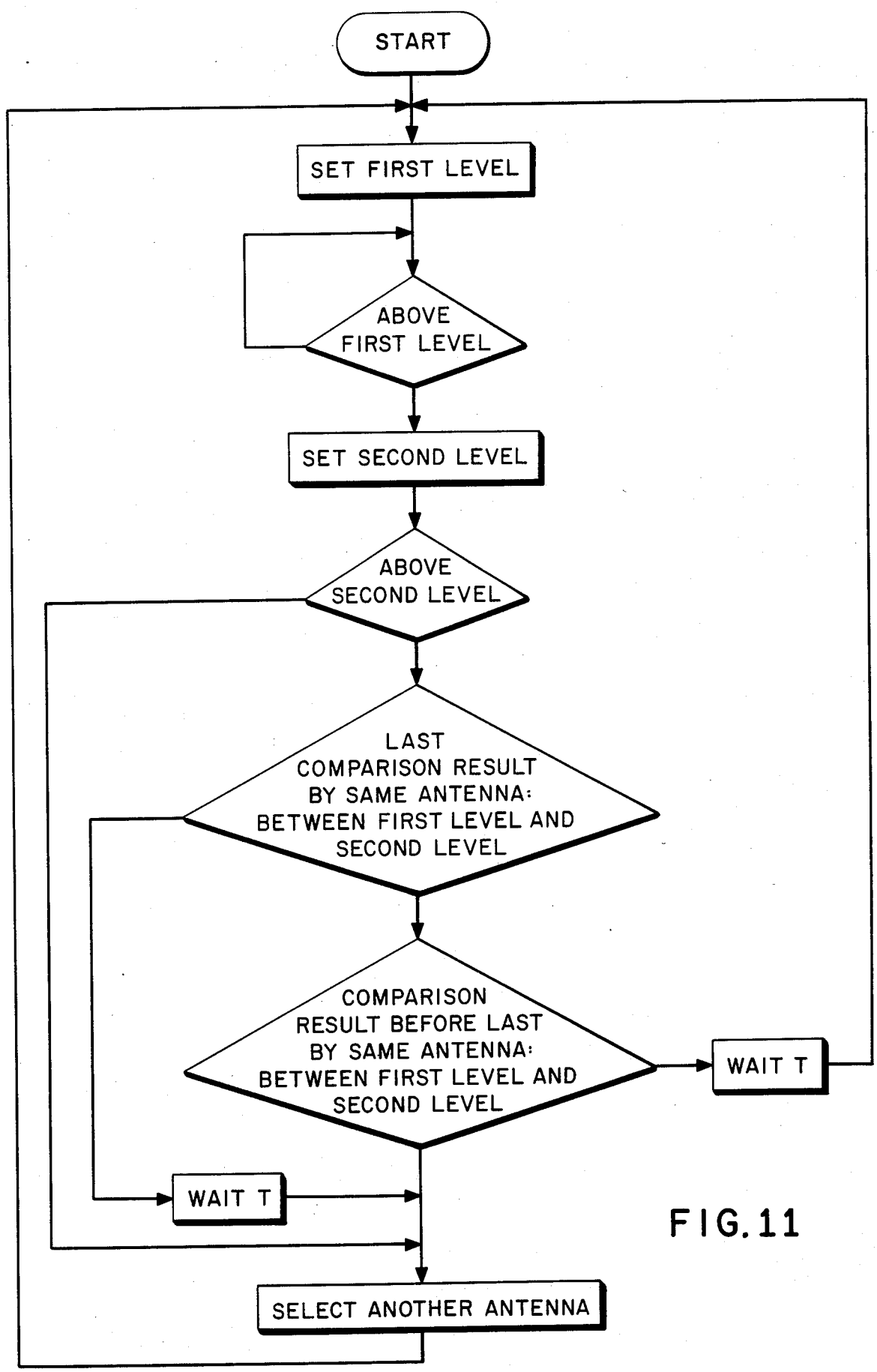

The predetermined time interval counted by control unit 72 may be set in a similar way as in the previously described embodiment above. Control unit 72 also controls the operation of audio frequency amplifier 45 to hold the latter for a determined short period of time so as to decrease switching noise upon switching between high-frequency amplifiers 411 and 412. Audio frequency amplifier 45 includes a holding circuit for performing this holding operation. When the output signal level falls within the range between the first and second levels, the control unit 71 may, as shown in FIG. 11, store the comparison results obtained by the comparator 60 and may control the antenna switching operation to inhibit switching between the antennas 1 and 2 if the last comparison result by same antenna indicates that the output signal level is in the range between the first level and the second level and the comparison result before last by same antenna indicates that the output signal level is not in the range between the first level and the second level.

In this embodiment unlike the embodiment shown in FIG. 10, control unit 72 causes continuous selection of one of the antennas for a time interval of 2×T, when the output signal level by selected antenna falls in the range between the first level and the second level.

Although comparators 60, 61 and 62 compare the output signals from squelch circuit 40 with the first and second level signals as they occur in analog form in each of the foregoing embodiments of the invention, the output signals from squelch circuit 40 can be converted to digital form by an A/D converter and can be compared with digital data corresponding to the first and second preset level signals stored in a memory means. The level of the output signal from squelch circuit 40 in each of the above-described embodiments is increased when the level of the reception signal is increased. However, the output signal from the squelch circuit may have a lower level when the reception signal has a higher level, and vice-versa. In the above embodiments, two preset levels are provided. However, three or four levels may be preset so as to use an antenna having a higher reception signal level.

The switch diversity system has been conventionally known. According to this system, there is provided one preset level as a reference so as to select the antenna having the better reception state. It is assumed that the above-described loop and monopole antennas are applied to the switch diversity system. According to the diversity system of this type, when the reception level of one of the antennas exceeds the preset level, the diversity effect can be obtained (i.e., a good reception signal level can be obtained). However, if the reception signal levels of both these antennas are below the preset level, the antenna having a better reception state can not be selected. In order to prevent this drawback, the preset level is replaced with a lower level. However, the quality of the reception signal level higher than the lower level is degraded, resulting in inconvenience. More particularly, even if the reception signal from one antenna have poor quality than from another, the antenna for receiving this reception signal kept on being selected. As a result, an antenna having a better reception state cannot be selected.

However, according to the present invention, at least two preset levels are provided to prevent the drawback described above. The antenna having the better reception state can always be selected regardless of given reception conditions.

We claim:

1. In a portable or mobile radio receiver for receiving a radio signal, a diversity reception system comprising:
   an electric-field-type antenna to intercept the radio signal;
   a magnetic-field-type antenna to intercept the radio signal;
   switching means responsive to a control signal for selectively connecting either said electric-field-type antenna or said magnetic-field-type antenna to the receiver;
   received level detecting means in the receiver for generating a received level signal representative of the level of the intercepted radio signal;
   reference level generating means for generating a first reference signal representative of a first reference level and a second reference signal representative of a second reference level smaller in magnitude than the first reference level; and
   comparison means connected to said received level detecting means and said reference level generating means for generating the control signal in response to a comparison among the received level signal, the first reference signal, and the second reference signal, such that
   (a) if the level of the intercepted radio signal is greater than the first reference level, the control signal is not generated;
   (b) if the level of the intercepted radio signal is not greater than the first reference level but greater than the second reference level, the control signal is generated after a time interval T; and
   (c) if the level of the intercepted radio signal is not greater than the second reference level, the control signal is generated substantially immediately.

2. The diversity reception system of claim 1 wherein said comparison means generates the control signal in response to a comparison of the relative magnitudes of the received level signal, the first reference signal, and the second reference signal.

3. The diversity reception system of claim 1 wherein said electric-field-type antenna is a monopole antenna and said magneticfield-type antenna is a loop antenna.

4. The diversity reception system of claim 1 wherein the radio receiver is contained within a housing having a side in which microphone and speaker perforations are formed, and said magnetic-field-type antenna is located within the housing normal to the side.

5. In a portable or mobile radio receiver for receiving a radio signal, a diversity reception system comprising:
   an electric-field-type antenna to intercept the radio signal;
   a magnetic-field-type antenna to intercept the radio signal;
   switching means responsive to a control signal for selectively connecting either said electric-field-type antenna or said magnetic-field-type antenna to the receiver;
   received level detecting means in the receiver for generating a received level signal representative of the level of the intercepted radio signal;
   reference level generating means for generating a first reference signal representative of a first reference level and a second reference signal representative of a second reference level smaller in magnitude than the first reference level; and
   comparison means connected to said received level detecting means and said reference level generating means for generating the control signal in response to a comparison of the relative magnitudes of the received level signal, the first reference signal, and the second reference signal, said comparison means generating the control signal only when the magnitude of the level of the intercepted radio signal is not greater than the magnitude of the first reference level.

6. The diversity reception system of claim 5 wherein said switching means is switched when the magnitude of the received level signal is not greater than the magnitude of said reference signal having the greater magnitude but is greater than the magnitude of said other reference signal.

* * * * *